United States Patent
Kaus et al.

(10) Patent No.: US 8,478,023 B2
(45) Date of Patent: Jul. 2, 2013

(54) METHOD OF MEASURING GEOMETRIC VARIABLES OF A STRUCTURE CONTAINED IN AN IMAGE

(75) Inventors: Michael Kaus, Hamburg (DE); Juergen Weese, Henstedt-Ulzburg (DE); Steven Lobregt, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1981 days.

(21) Appl. No.: 10/488,433

(22) PCT Filed: Sep. 3, 2002

(86) PCT No.: PCT/IB02/03632
§ 371 (c)(1),
(2), (4) Date: Mar. 2, 2004

(87) PCT Pub. No.: WO03/023717
PCT Pub. Date: Mar. 20, 2003

(65) Prior Publication Data
US 2005/0002556 A1    Jan. 6, 2005

(30) Foreign Application Priority Data
Sep. 7, 2001 (DE) .................................. 101 44 004

(51) Int. Cl.
*G06K 9/00* (2006.01)
(52) U.S. Cl.
USPC ............ 382/154; 382/131; 382/173; 345/419
(58) Field of Classification Search
USPC .................... 382/131, 154, 173, 180; 345/419
See application file for complete search history.

(56) References Cited

U.S. PATENT DOCUMENTS

| | | | | |
|---|---|---|---|---|
| 4,704,694 | A * | 11/1987 | Czerniejewski | 382/288 |
| 4,991,224 | A * | 2/1991 | Takahashi et al. | 382/180 |
| 5,531,520 | A * | 7/1996 | Grimson et al. | 382/131 |
| 5,898,793 | A * | 4/1999 | Karron et al. | 382/131 |
| 6,031,935 | A * | 2/2000 | Kimmel | 382/173 |
| 6,125,197 | A * | 9/2000 | Mack et al. | 382/154 |
| 6,268,846 | B1 * | 7/2001 | Georgiev | 345/419 |
| 6,301,498 | B1 * | 10/2001 | Greenberg et al. | 600/425 |
| 6,556,196 | B1 * | 4/2003 | Blanz et al. | 345/419 |
| 6,611,343 | B1 * | 8/2003 | Frankowski | 356/601 |
| 6,701,174 | B1 * | 3/2004 | Krause et al. | 600/407 |
| 6,788,210 | B1 * | 9/2004 | Huang et al. | 340/612 |
| 2002/0172407 | A1 * | 11/2002 | O'Donnell et al. | 382/131 |
| 2003/0072482 | A1 * | 4/2003 | Brand | 382/154 |
| 2005/0063581 | A1 * | 3/2005 | Viala et al. | 382/154 |

OTHER PUBLICATIONS

Lawerence H. Staib and James S. Duncan, "Model-Based Deformable Surface Finding for Medical Images," Oct. 1996, IEEE Transactions on Medical Imaging, vol. 15, No. 5, pp. 720-731.*

* cited by examiner

*Primary Examiner* — Brian Q Le
*Assistant Examiner* — Michael Vanchy, Jr.

(57) ABSTRACT

The invention relates to a method of measuring geometric variables of a three-dimensional structure contained in an object from at least on image representing the object, having the following steps:—use of a deformable first model describing the structure, the shape of which model can be described by parameters,—adjustment of the first model to the structure in the image,—determination of the parameters at which the first model exhibits optimum conformity with the structure,—use of a deformable second model describing the structure, which second model in shape corresponds to the first model, and which in addition contains at least one geometric variable,—modification of the second model according to the parameters determined, and—derivation of the geometric variable(s) from the modified second model.

5 Claims, 2 Drawing Sheets

$\widetilde{M}o$ $\widetilde{M}o^*$

METHOD OF MEASURING GEOMETRIC VARIABLES OF A STRUCTURE CONTAINED IN AN IMAGE

Figure 1:
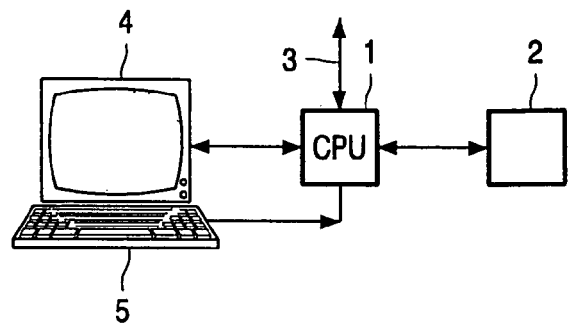

The invention relates to a method of measuring geometric variables of a three-dimensional structure contained in an object from at least one image of the object. The invention also relates to an image processing device for performing such a method and a computer program for such an image processing device.

In medical practice, there is a desire to be able to measure geometric variables of a three-dimensional structure contained in an object. The structure may be a vertebral column, the left ventricle of the heart or the head of the femur (caput femoris) situated at the upper end of the upper thighbone, for example. In the case of the head of the femur, for example, the position and orientation of the axis of the neck of the femur or the axis of the shaft of the femur in relation to the hipbone are of interest.

At present it is usual in such a case to plot the geometric variables, such as the axes, manually into an image containing the structure, such as the head of a femur, and to measure these variables manually. This method is very time-consuming and susceptible to error, and as a rule is incapable of providing reproducible results.

Largely automated methods are also already known for the segmentation of such a structure from an image of the object my means of so-called deformable models. Such a method is described in an article by Weese et al. in 17th International Conference on Information Processing (IPMI) Davis, USA, pp. 380-387, 2001. In this method the user merely sets an initial alignment of a computer model in relation to the structure in the image, the surface of the model being repeatedly and automatically modified or deformed until an optimum conformity is obtained between the structure in the image and the deformed model. The model determined in this way represents the segmented structure. Although it corresponds fairly accurately to the actual structure, the geometric variables on the surface thus found cannot as a rule be readily quantified automatically.

It is an object of the present invention to specify a method of measuring geometric variables which functions for the most part automatically and determines the geometric parameters reliably and reproducibly.

This object is achieved by a method of measuring geometric variables of a three-dimensional structure contained in an object from at least on image representing the object, comprising the following steps:
 use of a deformable first model describing the structure, the shape of which model can be described by parameters,
 adjustment of the first model to the structure in the image,
 determination of the parameters at which the first model exhibits optimum conformity with the structure,
 use of a deformable second model describing the structure, which second model in shape corresponds to the first model, and which in addition contains at least one geometric variable,
 modification of the second model according to the parameters determined and
 derivation of the geometric variable(s) from the modified second model.

In the case of the invention, therefore, a second model is used in addition to the first model which, as disclosed in the aforementioned article by Weese et al., is adjusted to the structure contained in the image. With regard to the shape or the surface, this model is identical to the first model but also contains the geometric variables as additional components.

The model found by the adjustment of the first model to the structure contained in the image can be characterized by a set of parameters. If the second model is modified according to these parameters, its surface is modified accordingly, and with it also the geometric parameters. The geometric variables, can therefore, be derived from the modified second model In the development of a representative embodiment, the parameters sought result directly from the adjustment process. The invention can also be used, however, in methods in which the adjustment is performed in some other way. Once the model optimally conforming to the structure contained in the image has been found, this model can be described by parameters, which then form the basis for the modification of the second model.

Theoretically, the number of parameters that can be used to describe a model is one less than the number of images manually segmented in a so-called training phase from which the model is derived. The development of another representative embodiment, by contrast, uses only the most relevant of the parameters. This speeds up the method significantly, whilst the error caused by disregarding the less relevant parameters remain small.

In another representative embodiment, the structure with the geometric variables to be determined is taken from a three-dimensional image of the object containing the structure, that is to say a data record, which describes the object in three directions. It is also possible, however, to use a plurality of two-dimensional images for this purpose, which represent the object in intersecting planes, as presented in German patent application 10111661.6 (PHDE 010063).

In another representative embodiment an image processing device performs the method according to a corresponding computer program of the present teachings.

Figure 2:
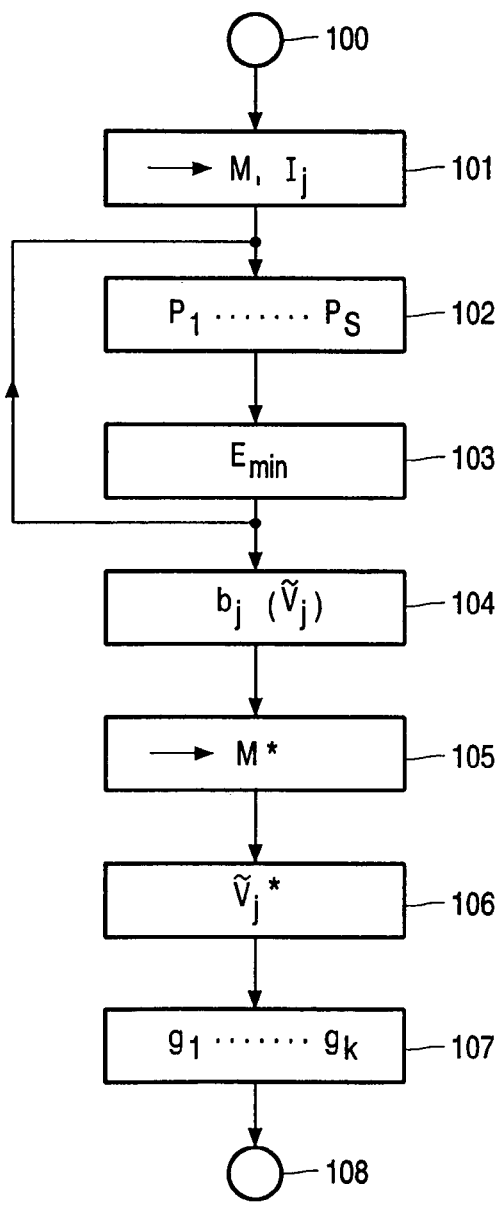
Figure 3:
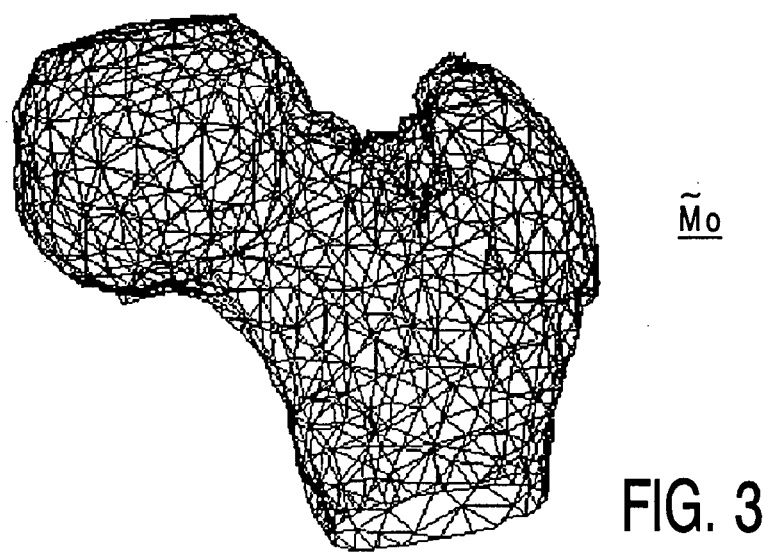
Figure 4:
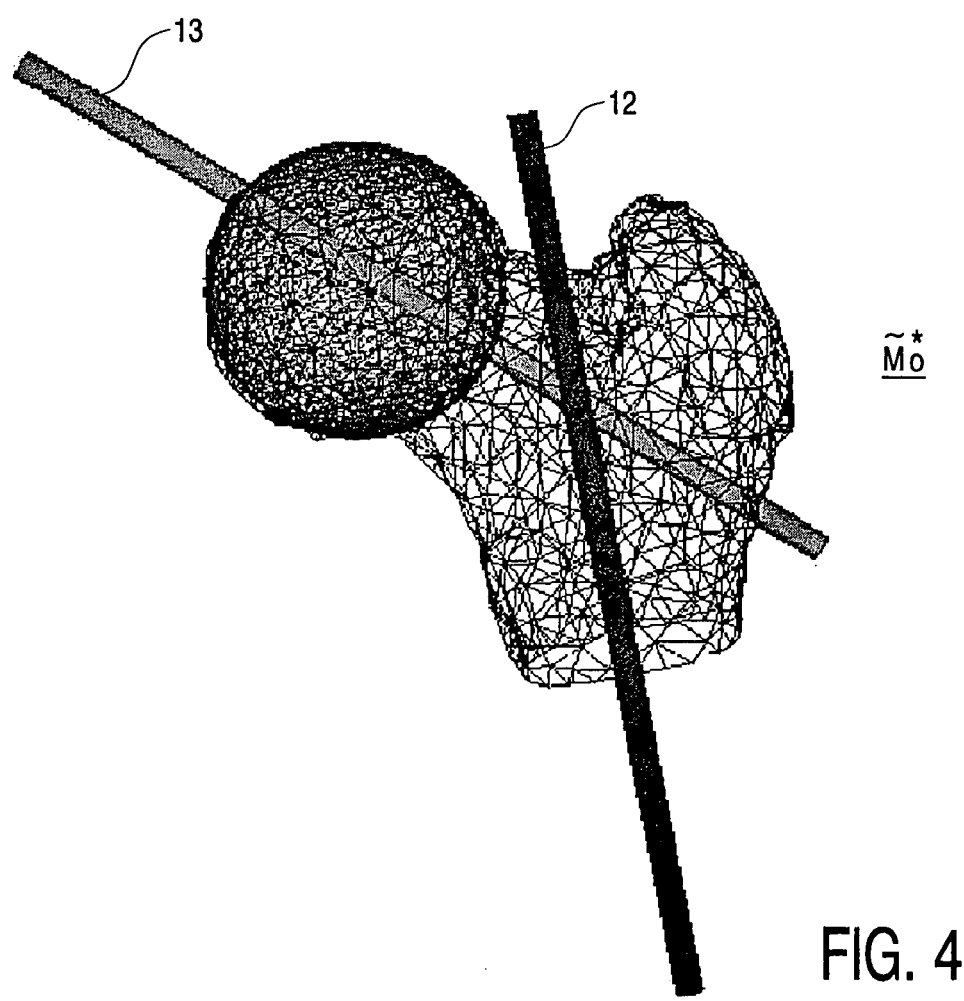

The invention will be further described with reference to examples of embodiments as shown in the drawings, to which, however, the invention is not restricted and in which:

FIG. 1 is a schematic representation of an image processing device suitable for performing the method according to the invention, FIG. 2 shows a flow chart of the method according to the invention, FIG. 3 shows the first model of the structure and FIG. 4 shows the second model of the same structure with the geometric variables.

The image processing device represented in FIG. 1 comprises an image processing and control processor 1 having a memory 2, in which a deformable model of a structure to be analyzed can be stored and which is capable of storing at least one three-dimensional image of an object to be analyzed. The image processing and control processor 1 can be coupled, by way of a bus system 3, to an imaging device, not represented in further detail, such as an MRI unit or an CT unit. The results obtained by the method according to the invention can be reproduced on a monitor 4. The user can access the image processing processor by way of a keyboard 5 or by means of other input units not represented in further detail in the drawing.

FIG. 2 represents a flow chart of a computer program, in accordance with which the image processing device determines the geometric variables.

After initialization in step 100, a first model of a structure to be analyzed together with a three-dimensional image, which represents an object having such a structure, are loaded in step 101.

The first model has already been compiled beforehand in a so-called training process, in which experts manually segment the structure (which in the context of the training process is hereinafter also referred to as "training structure") in a number of three-dimensional images of different patients. In the process, corresponding landmarks on the surface of any of these training structures are identified. These landmarks are interconnected via a polygonal network, for example a triangular network, which reproduces the surface of the training structure. The number s of landmarks is identical for all training structures, e.g. s=600.

Each training structure can be represented in a 3s dimensional space as a vector, which has as many components as the training structure has co-ordinates for landmarks, in this case therefore 3s components. This vector, which is referred to as shape vector, because it clearly describes the shape of the surface of the segmented structure, connects the origin of the co-ordinates to a point corresponding to the respectively segmented structure in a 3s dimensional space.

In accordance with the above, a shape-vector $\tilde{v}_i$ for the training structure may be given according to the relationship:

$$\tilde{v}_i = [v_{1x}^i, v_{1y}^i, v_{1z}^i \ldots v_{sx}^i, v_{sy}^i, v_{sz}^i] \quad (1)$$

In this $v_{1x}^i$, $v_{1y}^i$, $v_{1z}^i$ represent the x, y and z co-ordinates of the first landmark and $v_{sx}^i$, $v_{sy}^i$, $v_{sz}^i$ the co-ordinates of the last landmark of the training structure.

All training structures can be defined by such shape-vectors, the termini of which in each case describe a point in the 3s-dimensional space and form a paint cloud. From this a statistical model of the shape variation is produced (hereinafter termed a statistical shape-model) by applying a principal component analysis (PCA) to the shape-vectors of the training structures.

This statistical shape-model comprises a mean shape-vector $\tilde{m}_0$ according to the relationship $$\tilde{m}_0 = \frac{1}{t}\sum_{i=1}^{t} \tilde{v}_i \quad (2)$$

t being the number of training structures from which the model is derived. The model defined by the mean shape-vector is shown in FIG. 3.

The statistical shape-model also comprises t−1 eigenmodes $\tilde{m}_1, \tilde{m}_2 \ldots \tilde{m}_{t-1}$, which form the eigenvectors, perpendicular to one another, of the covariance matrix C:

$$C = \frac{1}{t}\sum_{i=1}^{t} (\tilde{v}_i - \tilde{m}_o)(\tilde{v}_i - \tilde{m}_o)^T \quad (3)$$

In this $(\ldots)^T$ symbolizes the conversion of a line vector into a column vector (and vice-versa).

The eigenvectors indicate in which directions (in the 3s-dimensional space) the training structures deviate from the mean shape-vector $\tilde{m}_0$. From the principal component analysis an eigenvalue is obtained for each eigenvector. The larger this eigenvalue, the more the training structures vary in the direction of the associated eigenvector. In the following it is assumed that the eigenvectors $\tilde{m}_1, \tilde{m}_2 \ldots \tilde{m}_{t-1}$ are ranked according to the magnitude of the eigenvalues, so that $\tilde{m}_1$ represents the eigenvector, in the direction of which the training structures vary most.

With the statistical shape-model obtained, it is possible to characterize any point in the 3s-dimensional space, i.e. any structure, by a set of up to t−1 parameters, which indicate the distance between the associated shape-vector and the mean shape-vector $\tilde{m}_0$—in each case quantified in the direction of the eigenvectors. In practice, it is possible to manage with a smaller number u of parameters, by only taking the u eigenvectors having the largest eigenvalues into account and disregarding all the others. The number u may be from 5 to 10 if the number of training structures from which the statistical shape-model was compiled, is 40, for example.

In step 101 the user, in addition, predetermines the position and the size of the model defined by the mean shape-vector $\tilde{m}_0$ with regard to the structure contained in the image. Everything else follows automatically.

A process of adjustment then commences, aimed at varying or deforming the model so that it conforms as closely as possible to the structure contained in the image. This method is described in detail in the aforementioned publication of Weese et al., to which reference is expressly made. This adjustment process will, therefore, only be summarized below:

Proceeding from the model defined by the mean shape-vector $\tilde{m}_0$, step 102 seeks to identify points $P_1 \ldots P_s$ in the image, perpendicular to the surface thereof, which might lie on the surface of the structure to be analyzed. From the points thus identified, a so-called energy function, which quantifies the difference between the structure characterized by the structure points identified and the suitably (translationally) displaced, rotated and/or enlarged/reduced model, is minimized in step 103.

Proceeding from this deformed model, structure points are again sought in step 102 and the associated energy function minimized in step 103. The program loop comprising the steps 102 and 103 is then repeated by way of optimization, until the model is so deformed that an optimal conformity is obtained between the model and the structure.

In stage 104 a parameter set $b_j$ is then determined, which describes a good approximation to the shape-vector $\tilde{v}_j$ of the model deformed in this way according to the relationship $$\tilde{v}_j \approx \tilde{m}_0 + Mb_j \quad (5)$$

In this, M is a matrix, which comprises the u eigenvectors of the statistical shape-model having the largest eigenvalues, according to the relationship $$M \approx [\tilde{m}_1, \tilde{m}_2 \ldots \tilde{m}_u] \quad (6)$$

The parameter set $b_j$ is a vector, which according to the relationship $$b_j = [b_{1j}, b_{2j} \ldots b_{uj}] \quad (7)$$

comprises u parameters $b_{1j}, b_{2j} \ldots b_{uj}$ each formed by one numerical value. The subsequent determination of the parameters $b_j$ in step 104 can be omitted if the adjustment of the model to the structure has already been performed in steps 102 and 103 by varying the parameters $b_{1j} \ldots b_{uj}$ of the model in order to adjust it (as is the case in the method described by Weese et al).

In step 105, a second model M* is then loaded. This model is compiled from the same training structures in the same training phase as the first model, but in addition to the information on the surface, expert knowledge on the geometric variables is also incorporated into the second model. These geometric variables may be the radius of the imaginary ball 11—cf. FIG. 4—on the head of the femur, for example, and/or the central point of this ball. The orientation of the axis 12 through the shaft of the femur or of the axis 13 through the neck of the femur can be predetermined as further geometric variables, and finally for each of them a point can be predetermined, which lies on the relevant axis in the head of the femur. All of these geometric variables are entered into the manually segmented training structures and measured by an expert in the training phase. The measured variables are attached as geometric components $g_1 \ldots g_k$ to a vector $\tilde{v}_i^*$ characterizing the surface of the training structure according to the relationship:

$$\tilde{v}_i^* = [v_{1x}^i, v_{1y}^i, v_{1z}^i \ldots v_{sx}^i, v_{sy}^i, v_{sz}^i, g_1 \ldots g_k] \quad (8)$$

This vector, referred to as shape/geometry-vector, therefore, differs from the shape-vector $\tilde{v}_i$ (cf. equation 1) only in that k geometric components $g_1 \ldots g_k$, which represent the geometric variables, are further attached to the 3s components which characterize the landmarks of the structure in question. If this geometric variable represents a point in or on the structure, three geometric components are needed for this, whereas for a radius of the head of the femur only one (additional) geometric component is needed.

From the shape/geometry vectors thus formed of the training structures it is in turn possible to generate a statistical model with a mean shape/geometry-vector $\tilde{m}_0^*$ according to $$\tilde{m}_0^* = \frac{1}{t}\sum_{i=1}^{t} \tilde{v}_i^* \quad (9)$$

and to generate a matrix for the model formed from the eigenvectors $\tilde{m}_1^* \ldots \tilde{m}_u^*$ according to $$\tilde{M}^* \approx [\tilde{m}_1^*, \tilde{m}_2^* \ldots \tilde{m}_u^*] \quad (10)$$

Once this second model M* has been loaded in step 105, it is modified in step 106 by the previously determined parameter $b_j$, according to the relationship $$\tilde{v}_j^* \approx \tilde{m}_0^* + M^* b_j \quad (11)$$

Since the matrix M* of the second model is a (3s+k, u) matrix, after multiplication by the parameter vector $b_j$ containing u components a vector is obtained, which contains 3s+k components—just like the mean shape/geometry-vector $\tilde{m}_0^*$. The last k-components of the shape/geometry-vector $\tilde{v}_j^*$, resulting from the product $M^* b_j$ and having 3s+k components, indicate how the vector found differs from the mean shape/geometry vector $\tilde{m}_0^*$. The last k components of the product therefore describe the changes in the geometric variables produced by the parameters $b_{1j} \ldots b_{uj}$ compared to the geometric variables which form the basis for the mean shape/geometry vector $\tilde{m}_0^*$.

Although these parameters have been derived from the first model M and not from the second model M*, these two models are identical in respect of the shape described therein. The deviation, defined by $b_j$, of the shape of the structure contained in the image $I_j$ from the surface defined by the mean shape-vector $\tilde{m}_0$ results in changes to the geometric variables, which for these reasons are appropriately described by the product $M^* b_j$.

Once the vector $\tilde{v}_j^*$ has been calculated according to equation 11 in step 106, the geometric variables $g_l \ldots g_k$ resulting from this can be output in numerical form in step 107. It is also possible, however, to insert these variables into the model conforming to the structure in the image $I_j$—as in FIG. 4.

As explained above, the first model and the second model are generated in the same training phase of the same training structures, and they are identical with regard to surface and/or shape, as equations 2 and 8 show. It is therefore possible, from the outset, to use only the ("second") model comprising the surface and the geometric variables (in step 101; step 105 could be omitted), and in the adjustment to the structure in the image to initially use only the components thereof serving to define the surface, before determining its geometric variables in accordance with equation 11. For this reason the terms "first" and "second" model are also to be interpreted in this sense in connection with the invention.

If adjustment of this model is furthermore performed through variation of the parameters $b_{1j} \ldots, b_{uj}$, it is easily possible, even during the adjustment (steps 102 and 103; step 104 would be omitted) to determine the geometric variables in each case from equation 11. Although this would require additional calculation, it might be advantageous where repeated adjustment would not be terminated automatically but by the user in the event of sufficient conformity between the structure in the image and the model.

The invention claimed is:

1. A method of measuring geometric variables of a three-dimensional structure contained in an object from at least one image (Ij) representing the object, comprising the following steps:
    use, by a processor, of a deformable first model (M) describing the structure, the shape of which model can be described by parameters (b),
    deformation, by the processor, of the first model until the first model conforms to an entirety of the structure in the image ($I_j$),
    determination, by the processor, of modified parameters ($b_j$) at which the first model exhibits optimum conformity with the structure,
    use, by the processor, of a deformable second model (M*) describing the structure, which second model in shape corresponds to the first model, and which in addition to the parameters (b) also contains at least one geometric variable,
    modification, by the processor, of the parameters (b) of the second model in a same manner as that of the parameters (b) of the first model, a result of such modification being modified parameters ($b_j$) at which the second model also exhibits optimum conformity with the structure, and
    derivation, by the processor, of a resultant modified geometric variable(s) after the modification of the parameters (b) of the second model.

2. A method as claimed in claim 1, wherein the model is adjusted to the structure by varying the parameters.

3. A method as claimed in claim 1, wherein a three-dimensional image of the object is used for measuring at least one geometric variable.

4. An image processing device for measuring geometric variables of a three-dimensional structure contained in an object from at least one image representing the object, having a non-transitory storage device for storing the image, a deformable first model describing the structure, the shape of which model can be described by parameters, and a deformable second model describing the structure, which second model in shape corresponds m the first model, and which in addition contains at least one geometric variable, and having an image processing device for processing the image according to the following steps
    deformation of the first model until the first model conforms to an entirety of the structure in the image,
    determination of modified parameters at which the first model exhibits optimum conformity with the structure,
    modification of the parameters of the second model in a same manner as that of the parameters of the first model, a result of such modification being modified parameters at which the second model also exhibits optimum conformity with the structure, and derivation of a resultant modified geometric variable(s) after the modification of the parameters of the second model.

5. A non-transitory computer-readable medium with a computer program embodied thereon, for an image processing device for measuring geometric variables of a three-dimensional structure contained in an object from at least one image representing the object, comprising the following steps:

use of a deformable first model describing the structure, the shape of which model can be described by parameters, deformation of the first model until the first model conforms to an entirety of the structure in the image, determination of modified parameters at which the first model exhibits optimum conformity with the structure, use of a deformable second model describing the structure, which second model in shape corresponds to the first model, and which in addition to the parameters also contains at least one geometric variable, modification of the parameters of the second model in a same manner as that of the parameters of the first model, a result of such modification being modified parameters at which the second model also exhibits optimum conformity with the structure, and derivation of a resultant modified geometric variable(s) after the modification of the parameters of the second model.

* * * * *